(12) United States Patent
Yang et al.

(10) Patent No.: US 8,693,895 B2
(45) Date of Patent: Apr. 8, 2014

(54) SIGNAL TRANSMISSION AND RECEPTION DEVICE AND METHOD

(75) Inventors: Qi Yang, Wuhan (CN); Tao Zeng, Wuhan (CN); Xiaoyin Zhang, Wuhan (CN); Zhu Yang, Wuhan (CN); Shaohua Yu, Wuhan (CN)

(73) Assignee: Wuhan Research Institute of Posts and Telecommunications, Wuhan, Hubei Province (CN)

( * ) Notice: Subject to any disclaimer, the term of this patent is extended or adjusted under 35 U.S.C. 154(b) by 77 days.

(21) Appl. No.: 13/304,355

(22) Filed: Nov. 24, 2011

(65) Prior Publication Data
US 2013/0121706 A1 May 16, 2013

(30) Foreign Application Priority Data

Nov. 11, 2011 (CN) .......................... 2011 1 0356600

(51) Int. Cl.
*H04B 10/06* (2011.01)
*H04B 10/00* (2013.01)

(52) U.S. Cl.
USPC ............................ 398/202; 398/203; 398/140

(58) Field of Classification Search
USPC .......................................... 398/140, 202, 182
See application file for complete search history.

(56) References Cited

U.S. PATENT DOCUMENTS

| 5,864,414 | A | * | 1/1999 | Barnsley et al. | 398/71 |
|---|---|---|---|---|---|
| 6,563,881 | B1 | * | 5/2003 | Sakoda et al. | 375/260 |
| 2011/0069975 | A1 | * | 3/2011 | Liu et al. | 398/202 |
| 2011/0103794 | A1 | * | 5/2011 | Gottwald | 398/58 |
| 2012/0063768 | A1 | * | 3/2012 | Kim et al. | 398/25 |
| 2012/0087678 | A1 | * | 4/2012 | Earnshaw | 398/202 |
| 2013/0101295 | A1 | * | 4/2013 | Dupuis | 398/79 |

OTHER PUBLICATIONS

Transmit power adaption for multiuser OFDM system, IEEE Journal on selected areas in communications, vol. 21, No. 2, Feb. 2003.*

* cited by examiner

*Primary Examiner* — Ken Vanderpuye
*Assistant Examiner* — Mina Shalaby
(74) *Attorney, Agent, or Firm* — Dentons US LLP

(57) ABSTRACT

A signal transmission and reception device and method are provided. The transmission method comprises generating multiple optical carriers from a basic optical carrier; modulating optical carriers, except for a predetermined optical carrier, in the optical carriers by using multiple data signals respectively, to generate multiple optical modulated signals; and synthesizing the multiple optical modulated signals and the predetermined optical carrier into a single optical signal, and transmitting the signal. The reception method comprises separating an optical signal into multiple optical carriers, the optical carriers having different frequencies and including a predetermined optical carrier; generating from the predetermined optical carrier multiple optical waves, frequencies of which correspond to frequencies of optical carriers, except for the predetermined optical carrier, in the multiple optical carriers; and demodulating the optical carriers, except for the predetermined optical carrier, in the multiple optical carriers by using the multiple optical waves respectively.

6 Claims, 5 Drawing Sheets

SIGNAL TRANSMISSION AND RECEPTION DEVICE AND METHOD

This application is based upon and claims the benefit of priority from the prior Chinese Patent Application CN 201110356600.8, filed in the State Intellectual Property Office of the P.R.C. on 11 Nov. 2011, the disclosure of which is hereby incorporated by reference in its entirety.

TECHNICAL FIELD

The present invention relates generally to optical communication, and in particular to a signal transmitting device and a signal transmitting method, and a signal receiving device and a signal receiving method employed in optical communication.

DESCRIPTION OF RELATED ART

In the field of optical communication, optical orthogonal frequency division multiplexing (OFDM) has the potential for use in a long distance transmission due to of its characteristics such as high spectrum efficiency, desirable tolerance on dispersion/polarization mode dispersion, a flexibly changeable bandwidth, and others. In an optical OFDM system, a direct detection mode and a coherent detection mode have been studied respectively at a receiving side. Since the coherent detection may recover a complex electric field of a received signal completely, and may detect information including intensity, phase, and the like of the signal, the coherent detection mode yields a higher sensitivity than the direct detection mode, which has been widely recognized. However, in a conventional coherent detection mode, a local oscillating optical source that generates a local oscillating light for demodulation of optical signals is provided at the receiving side, which adds cost to the overall system. Some researcher has proposed to extract a carrier signal from the received optical signal at the receiving side to produce a local oscillating light, but the bandwidth of a receiving signal can accept a signal carried on a frequency band that corresponds to the local oscillating light due to the limited bandwidth of an analog-to-digital converter at the receiving side, which significantly limits a spectrum width of a signal at a transmitting side, which in turns affects the transmission rate of a system.

Therefore, it is desirable to have a signal transmitting device and a signal transmitting method and correspondingly a signal receiving device and a signal receiving method, which may realize transmission and reception of a signal at a reduced cost as well as on a wide frequency band.

SUMMARY OF THE INVENTION

The present invention describes a signal transmitting device and a signal transmitting method that transmit a signal on a wide frequency band, thereby improving the transmission rate of a system. The present invention also provides a signal receiving device and a signal receiving method, which may achieve reception of a signal on a wide frequency band at a lower cost, thereby reducing the cost of the overall system and improving the transmission rate of the system.

In some embodiments, a signal transmitting device comprising a multi-carrier generating unit for generating multiple optical carriers from a basic optical carrier, the multiple optical carriers having frequencies different from each other, and including the basic optical carrier; a modulation unit for modulating optical carriers, except for a predetermined optical carrier, in the multiple optical carriers with multiple data signals, respectively, so as to generate multiple optical modulated signals; and a synthesizing unit for synthesizing the multiple optical modulated signals and the predetermined optical carrier into a single optical signal, and transmitting the optical signal.

In some embodiments, a signal transmitting method comprising generating multiple optical carriers from a basic optical carrier, the multiple optical carriers having frequencies different from each other, and including the basic optical carrier; modulating optical carriers, except for a predetermined optical carrier, in the multiple optical carriers with multiple data signals, respectively, so as to generate multiple optical modulated signals; and synthesizing the multiple optical modulated signals and the predetermined optical carrier into a single optical signal, and transmitting the optical signal.

In some embodiments, a signal receiving device comprising a separation unit for separating a received optical signal into multiple optical carriers, the multiple optical carriers having frequencies different from each other, and including a predetermined optical carrier; a multi-carrier generating unit for generating multiple optical waves for demodulation from the predetermined optical carrier, frequencies of the multiple optical waves for demodulation corresponding to frequencies of optical carriers, except for the predetermined optical carrier, in the multiple optical carriers; and a demodulation unit for demodulating the optical carriers, except for the predetermined optical carrier, in the multiple optical carriers with the multiple optical waves for demodulation, respectively, so as to recover data signals.

In some embodiments, a signal receiving method comprising separating a received optical signal into multiple optical carriers, the multiple optical carriers having frequencies different from each other, and including a predetermined optical carrier; generating multiple optical waves for demodulation from the predetermined optical carrier, frequencies of the multiple optical waves for demodulation corresponding to frequencies of optical carriers, except for the predetermined optical carrier, in the multiple optical carriers; and demodulating the optical carriers, except for the predetermined optical carrier, in the multiple optical carriers with the multiple optical waves for demodulation, respectively, so as to recover data signals.

In some embodiments, the signal transmitting device and method as described in the above embodiments, multiple optical carriers are generated from the basic optical carrier, then the multiple optical carriers, except for a predetermined optical carrier, are used to transmit data, so that different data may be transmitted on a wide frequency band, and thereby the transmission rate of the system may be improved. Additionally, in the signal receiving device and method according to the above embodiments, multiple optical waves generated from a predetermined optical carrier are used as local oscillating lights to perform demodulation of an optical signal, so that it is not necessary to provide a local oscillator at the receiving side, which reduces the cost of the system, and at the same time, a transmitted signal may be received on a wide frequency band, which improves the performance of the system.

BRIEF DESCRIPTION OF THE DRAWINGS

The above and other objects, features, and advantages of the present invention will become more apparent from the detailed description of embodiments of the present invention in conjunction with the attached drawings, in which.

DETAILED DESCRIPTION

A signal transmitting device and method and a signal receiving device and method according to an embodiment of the invention will be described below with reference to the attached drawings.

Figure 1:
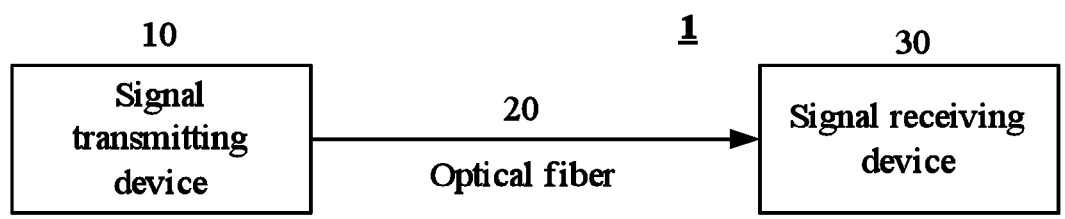
FIG. 1 is a block diagram showing an optical communication system according to an embodiment of the invention.

An optical communication system according to an embodiment of the invention is firstly described with reference to FIG. 1. The optical communication system 1 comprises a signal transmitting device 10, an optical fiber 20 and a signal receiving device 30, and the signal transmitting device 10 is connected to the signal receiving device 30 via the optical fiber 20.

Figure 2:
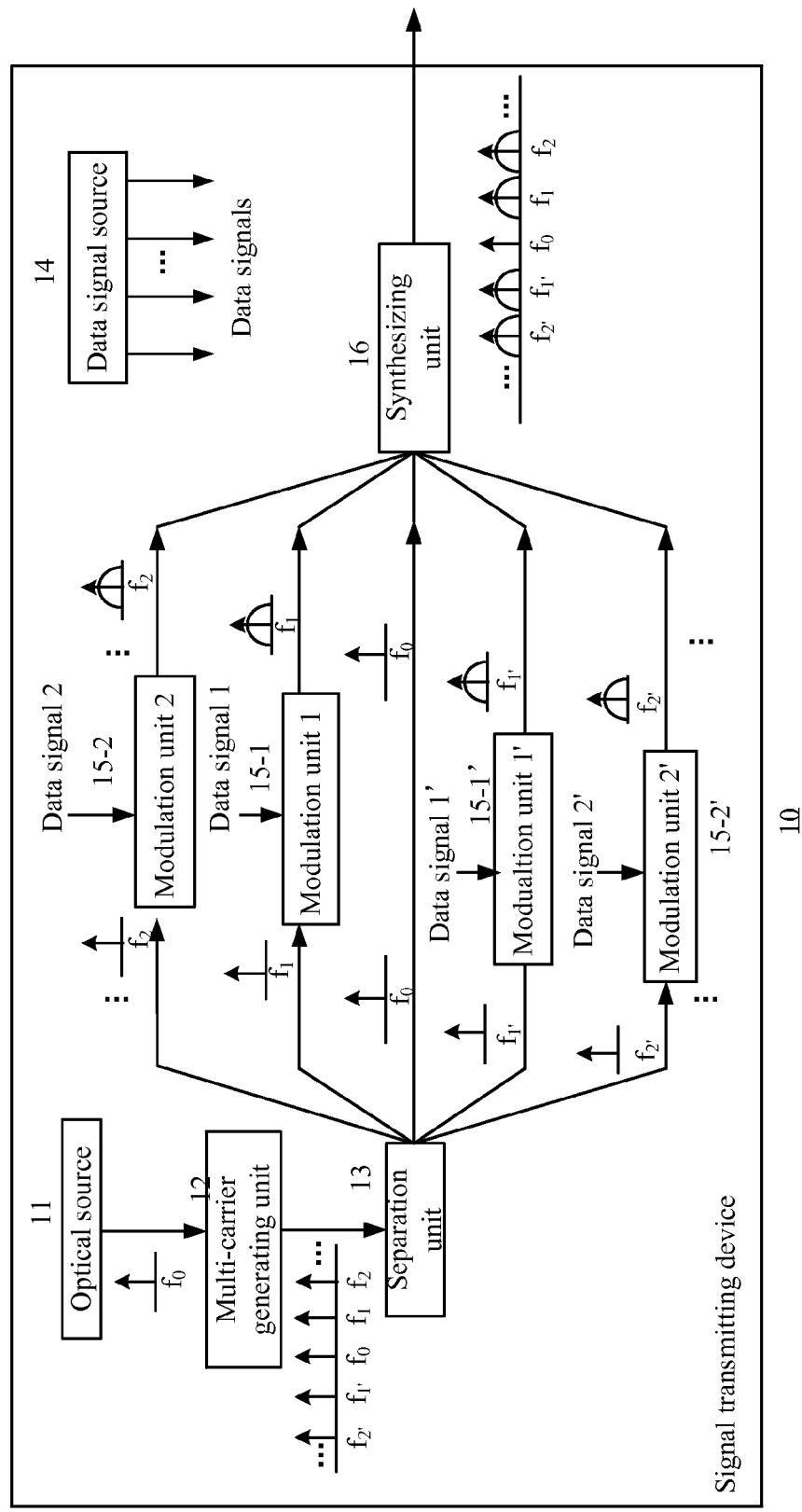
FIG. 2 is a block diagram showing a signal transmitting device according to an embodiment of the invention.

FIG. 2 shows a block diagram of the signal transmitting device 10. As shown in FIG. 2, the signal transmitting device 10 comprises an optical source 11, a multi-carrier generating unit 12, a separation unit 13, a data signal source 14, multiple modulation units 15-1, 15-2, 15-1', 15-2', . . . , and a synthesizing unit 16.

The optical source 11 may be implemented by a single-frequency laser. It generates a laser (basic optical carrier) with a frequency of $f_0$ (basic frequency), and outputs the basic optical carrier to the multi-carrier generating unit 12.

The multi-carrier generating unit 12 generates multiple optical carriers ($f_{2'}$, $f_{1'}$, $f_0$, $f_1$, $f_2$, . . . ) from the basic optical carrier ($f_0$), the multiple optical carriers having frequencies different from each other, and including the basic optical carrier. Depending on actual needs, the multiple optical carriers may be generated so that the basic optical carrier is located at any position, relative to the other optical carriers, on a frequency axis. For example, the basic optical carrier may be located at the left side or the right side of the other optical carriers. Alternatively, as shown in FIG. 2, the optical carriers, except for the basic optical carrier, in the multiple optical carriers may be distributed symmetrically at both sides of the basic optical carrier on the frequency axis, respectively.

The multi-carrier generating unit 12 may be implemented by a frequency shifter which shifts the basic optical carrier to multiple different frequency positions on the frequency axis, respectively, to generate the multiple optical carriers. Alternatively, the multi-carrier generating unit 12 may be implemented in other manners commonly known in the art. For example, the multi-carrier generating unit 12 may be implemented by a type of modulator, such as an intensity modulator, a phase modulator or the like, combined with a fiber loop feedback structure or a non-linear device, e.g., non-linear optical fiber.

In some embodiments, since the multiple optical carriers generated by the multi-carrier generating unit 12 are mixed together, the separation unit 13 receives the multiple optical carriers, separates them from each other, and then outputs the multiple separated optical carriers via, for example, different paths, as shown in FIG. 2. The separation unit 13 may be implemented by a plurality of band-pass optical filters having different pass bands, in which case each band-pass optical filter has a pass band corresponding to one optical carrier, filters out (or removes) other optical carriers except for the one optical carrier that it corresponds to, and output the one optical carrier. Alternatively, the separation unit 13 may be implemented by a tunable optical filter, the pass band of which may be tuned to output the multiple optical carriers sequentially. Alternatively, the separation unit 13 may be implemented by a demultiplexer commonly known in the art. In the multiple separated optical carriers, a predetermined optical carrier in the multiple optical carriers is output directly to the synthesizing unit 16, and the other optical carriers are output respectively to the multiple modulation units for modulation. The predetermined optical carrier may be the basic optical carrier ($f_0$), or an optical carrier different from the basic optical carrier. By way of example, a case where the predetermined optical carrier is the basic optical carrier is shown in FIG. 2. In this case, the basic optical carrier ($f_0$) is output directly to the synthesizing unit 16, and the other optical carriers ($f_{2'}$, $f_{1'}$, $f_1$, $f_2$, . . . ) are output respectively to first input terminals of the multiple modulation units 15-2', 15-1', 15-1, 15-2, . . . , respectively. In some embodiments, the multi-carrier generating unit 12 may generate the multiple optical carriers which are separate from each other rather than being mixed together, in which case it is unnecessary to perform the above separating operation, and instead, the multiple optical carriers may be output directly from the multi-carrier generating unit 12 to the synthesizing unit 16 (the predetermined optical carrier) and the modulation units (the other optical carriers), thus the separation unit 13 may be omitted.

The data signal source 14 generates multiple data signals (2', 1', 1, 2, . . . ) carrying data to be transmitted, and provides the multiple data signals to seconds input terminals of the multiple modulation units 15-2', 15-1', 15-1, 15-2, . . . , respectively. The multiple data signals may carry the same data or different data.

The multiple modulation units 15-2', 15-1', 15-1, 15-2, . . . modulate the optical carriers received at their first input terminals (i.e. the other optical carriers except for the predetermined optical carrier, and in the example shown in FIG. 2, the other optical carriers except for the basic optical carrier, the frequencies of which are $f_{2'}$, $f_{1'}$, $f_1$, $f_2$, . . . , respectively) by using the data signals (2', 1', 1, 2, . . . ) received at their second input terminals, respectively, so as to generate multiple optical modulated signals. As shown in FIG. 2, the multiple optical modulated signals have the same frequencies (center frequencies) as the frequencies of the optical carriers input into the respective modulation units, respectively. The specific method for the modulation is well known in the art, thus a detailed description thereof is omitted. The respective optical modulated signals are provided to the synthesizing unit 16. As can be seen, in the embodiment of the invention, the predetermined optical carrier (e.g. the basic optical carrier) in the multiple optical carriers is not modulated, and only the other optical carriers are modulated.

The synthesizing unit 16 may be a multiplexer that synthesizes the multiple optical modulated signals output from the respective modulation units with the predetermined optical carrier (as shown in FIG. 2 with the example of the basic optical carrier) into a single (or composite) optical signal, the schematic waveform of which is shown in FIG. 2, and transmits the optical signal via the optical fiber 20.

In the signal transmitting device according to the embodiment of the invention, multiple optical carriers are generated from a single optical carrier, therefore the number of optical carriers used to carry data may be increased in case of one optical source, and the total information rate of the optical communication system may be increased. Furthermore, the optical communication system has more flexibility and practicability by using different data signals to modulate the respective optical carriers (except for the predetermined optical carrier) so that the respective optical carriers carry different data.

It is to be noted that although one data signal source which generates multiple data signals is shown in FIG. 2, this is only illustrative, and multiple data signal sources may be used, each of which generates one data signal and outputs it to a corresponding modulation unit. Alternatively, the signal transmitting device may not include the data signal source, and instead, it receives the multiple data signals from outside. Additionally, in one embodiment, optical carriers having 5 frequencies ($f_{2'}$, $f_{1'}$, $f_0$, $f_1$, $f_2$) and 4 modulation units are shown in FIG. 2 for simplicity, but this is intended as illustrative, and any number of optical carriers may be generated according to needs, and correspondingly any number of modulation units may be provided.

Figure 3:
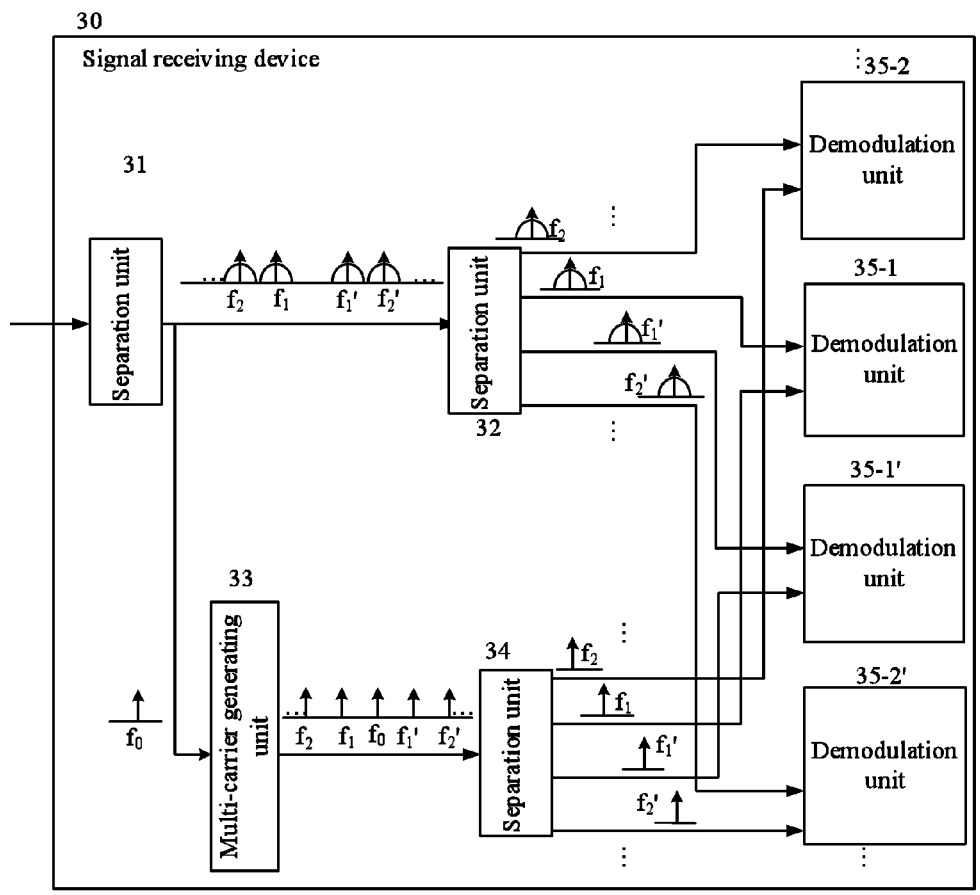
FIG. 3 is a block diagram showing a signal receiving device according to an embodiment of the invention.

A signal receiving device according to an embodiment of the invention is described with reference to FIG. 3. As shown in FIG. 3, the signal receiving device 30 comprises separation units 31 and 32, a multi-carrier generating unit 33, a separation unit 34, and a plurality of demodulation units 35-1, 35-2, 35-1', 35-2', . . . The signal receiving device 30 receives the aforesaid optical signal transmitted from the signal transmitting device 10 via the optical fiber 20. This optical signal is provided to the separation unit 31.

The separation unit 31 separates a predetermined optical carrier from the optical signal, and outputs it into the multi-carrier generating unit 33. The separated predetermined optical carrier is the same as the above predetermined optical carrier selected in the signal transmitting device, and it may be the aforesaid basic optical carrier or another optical carrier. Given the example shown in FIG. 2 where the basic optical carrier is used as the predetermined optical carrier, the basic optical carrier ($f_0$) is also used as the predetermined optical carrier in the example of the signal receiving device shown in FIG. 3. The rest of the optical signal (optical carriers) is output by the separation unit 31 to the separation unit 32. The separation unit 32 further separates the rest of the optical signal into multiple optical carriers, as shown in FIG. 3, and frequencies (center frequencies) of the respective optical carriers are consistent with the frequencies of the respective optical modulated signal generated in the signal transmitting device, respectively. Thus, the received optical signal is separated into a plurality of optical carriers having frequencies different from each other by the separation units 31 and 32, and the frequencies of the plurality of optical carriers are the same as those of the multiple optical carriers generated in the signal transmitting device, respectively.

Similar to the separation unit 13 described with respect to FIG. 2, the separation units 31 and 32 may be implemented by multiple band-pass optical filters, tunable optical filters, or de-multiplexers, respectively. For example, in the example where the predetermined optical carrier is the basic optical carrier ($f_0$), when the separation units 31 and 32 are implemented by tunable optical filters, respectively, a center of a pass band of the separation unit 31 may be tuned to the basic frequency $f_0$ to filter out (remove) optical carriers other than the basic optical carrier and thus obtain the basic optical carrier, and a center of a pass band of the separation unit 32 may be tuned to frequency $f_k$ (k=2', 1', 1, 2, . . . ), to filter out optical carriers other than the optical carrier with a frequency of $f_k$ and thus obtain the optical carrier with a frequency of $f_k$. The separation unit 32 outputs the separated multiple optical carriers (not including the predetermined optical carrier) to first input terminals of the respective demodulation units, respectively. In the example shown in FIG. 3, the separation unit 32 outputs the separated multiple optical carriers ($f_{2'}$, $f_{1'}$, $f_1$, $f_2$, . . . , not including $f_0$) to the first input terminals of the demodulation units 35-2', 35-1', 35-1, 35-2, . . . , respectively.

The multi-carrier generating unit 33 is similar to the multi-carrier generating unit 12. It generates multiple optical waves for demodulation from the predetermined optical carrier in a manner similar to that of the multi-carrier generating unit 12. Frequencies of the multiple optical waves for demodulation are the same as center frequencies of the respective optical carriers output from the separation unit 32, respectively. In the example shown in FIG. 3, multiple optical waves for demodulation (frequencies of which are $f_{2'}$, $f_{1'}$, $f_1$, $f_2$, . . . , respectively) are generated from the basic optical carrier ($f_0$).

In some embodiments, when the multiple optical waves for demodulation generated by the multi-carrier generating unit 33 are mixed together, the separation unit 34 receives the multiple optical waves for demodulation and separates them from each other, and outputs the respective separated optical waves for demodulation to second input terminals of corresponding demodulation units, respectively. Specifically, in the example shown in FIG. 3, the optical wave for demodulation with a frequency of $f_k$ (k=2', 1', 1, 2, . . . ) is input to the second input terminal of the demodulation unit which receives the optical carrier signal with a frequency of $f_k$. In other embodiments where the multi-carrier generating unit 33 generates multiple optical waves which are separate from each other rather than being mixed together, the separation unit 33 may be omitted.

The demodulation units 35-2, 35-1, 35-1', 35-2', . . . demodulate the optical carriers input to the first input terminals thereof by using the optical waves for demodulation input to the second input terminals thereof, respectively, and thereby recover data signals.

The multiple demodulation units are described in more detail with reference to FIG. 4. Since the structures of the respective demodulation units are substantially the same, the demodulation unit 35-k is described here as a representative example.

Figure 4:
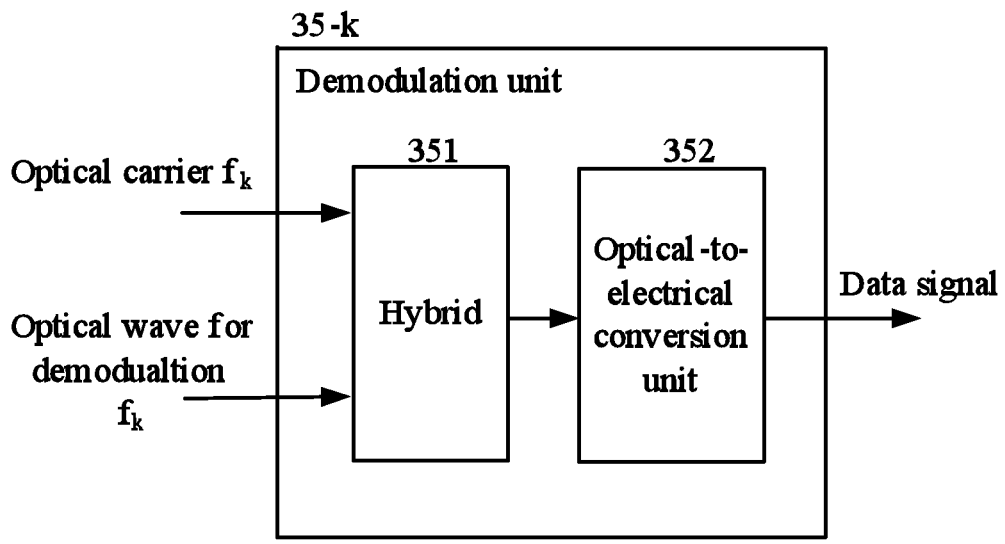
FIG. 4 is a block diagram showing an exemplary structure of a demodulation unit shown in FIG. 3.

FIG. 4 shows an exemplary structure of the demodulation unit. As shown in FIG. 4, the demodulation unit 35-k comprises a hybrid 351 and an optical-to-electrical conversion unit 352. The optical carrier (the frequency of which is $f_k$) input to the first input terminal of the demodulation unit 35-k and the optical wave for demodulation (the frequency of which is also $f_k$) input to the second input terminal of the demodulation unit 35-k are mixed in the hybrid 351, and the mixed light (optical signal) is output to the optical-to-electrical conversion unit 352. The optical-to-electrical conversion unit 352 may be implemented by, for example, a photodiode, and it performs an optical-to-electrical conversion on the mixed optical signal to thereby generate a data signal. It is to be noted that the method of using the hybrid and the optical-to-electrical conversion unit to demodulate the optical carrier to generate a corresponding data signal is well known in the art, and thus is only described briefly here. Beside the structure shown in FIG. 4, other modes commonly known in the art may also used to implement the demodulation of the optical carriers.

The respective demodulation units 35-2, 35-1, 35-1', 35-2', . . . demodulate the multiple optical carriers in the same manner as the demodulation unit 35-k to generate corresponding data signals, thereby realizing reception of the data.

The signal receiving device shown in FIG. 3 is only exemplary, and various changes may be made thereto by those skilled in the art without departing the spirit and scope of the invention. For example, although in the signal receiving device shown in FIG. 3, the predetermined optical carrier and the other optical carriers are separated in two stages by using the separation units 31 and 32, it is also possible to use one separation unit to separate all optical carriers including the predetermined optical carrier and the other optical carriers from the received optical signal. Additionally, only optical carriers having 5 frequencies ($f_{2'}$, $f_{1'}$, $f_0$, $f_1$, $f_2$) and 4 demodulation units are shown in FIG. 3 for simplicity, but this is only illustrative, and a corresponding number of optical carriers may be separated according to the number of frequencies used in the signal transmitting device and a corresponding number of demodulation units may be provided.

In the signal receiving device according to the embodiment of the invention, multiple optical waves for demodulation are generated from the predetermined optical carrier separated from the received optical signal, and then are used as "local oscillating lights" to demodulate the respective optical carriers. In this way, no local oscillating light source for generating the local oscillating lights are needed, which reduces the cost of the signal receiving device and accordingly of the optical communication system. Additionally, since the number (and frequencies) of the optical waves for demodulation generated from the predetermined optical carrier may be increased according to needs, that is, the optical waves for demodulation may be generated on a wide frequency band, the optical carriers on the wide frequency band may be demodulated at the receiving side so that the receiving side is never a bottleneck limiting the rate of the optical communication system.

Figure 5:
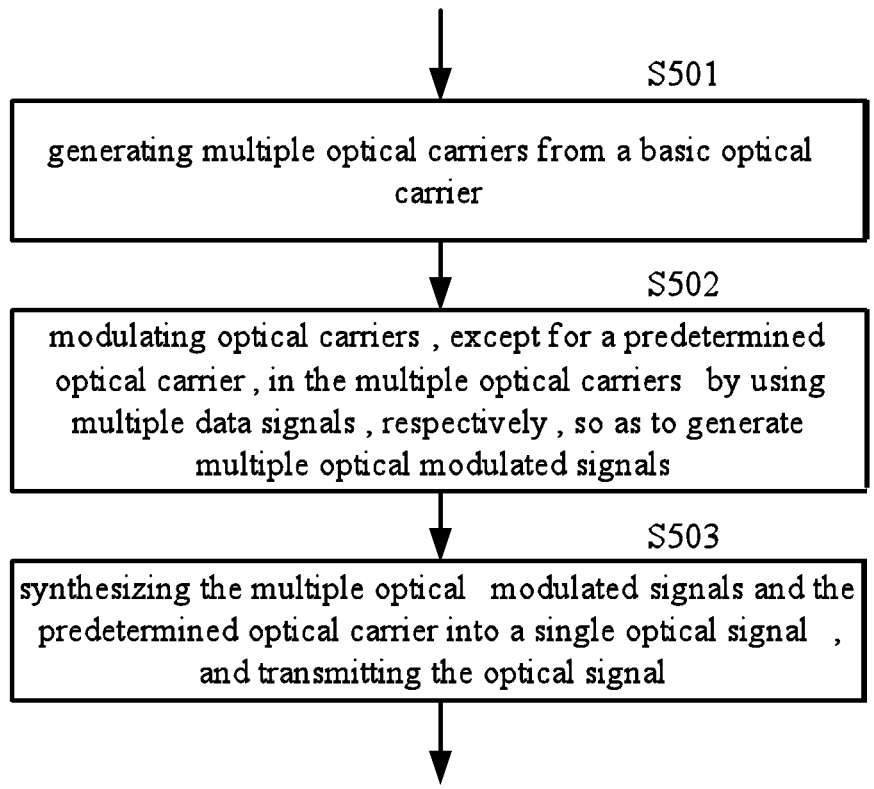
FIG. 5 is a flow chart showing a signal transmitting method according to an embodiment of the invention.

A signal transmitting method and a signal receiving method according to an embodiment of the invention will be described. FIG. 5 shows a flow chart of the signal transmitting method according to an embodiment of the invention. As shown in FIG. 5, at a transmitting side, multiple optical carriers are generated from a basic optical carrier in step S501, the multiple optical carriers having frequencies ($f_{2'}$, $f_{1'}$, $f_0$, $f_1$, $f_2$, ...) different from each other, and including the basic optical carrier (the frequency of which is $f_0$).

This step may be performed by the multi-carrier generating unit as shown in FIG. 2. The basic optical carrier may come from a single-frequency laser. As described above, the multiple optical carriers may be generated by shifting the basic optical carrier to different frequency positions on the frequency axis, respectively, or may be generated from the basic optical carrier in other manners commonly known in the art. In the generated multiple optical carriers, the basic optical carrier may be located at any position, relative to the other optical carriers, on the frequency axis. For example, the optical carriers, except for the basic optical carrier, in the multiple optical carriers may be distributed symmetrically at both sides of the basic optical carrier on the frequency axis, respectively. In the case where the multiple optical carriers are mixed together, the multiple optical carriers are separated from each other subsequently by using, for example, the separation unit 13 described above. In the case where the multiple optical carriers are generated separately from each other, it is unnecessary to perform this separation operation.

In step S502, the optical carriers, except for a predetermined optical carrier, in the multiple optical carriers are modulated by using multiple data signals, respectively, so as to generate multiple optical modulated signals. The optical carriers except for the predetermined optical carrier may be modulated with the respective data signals by for example the multiple modulation units shown in FIG. 2. The respective data signal may carry the same data or different data, and the predetermined optical carrier may be the basic optical carrier or any optical carrier other than the basic optical carrier. As described above, the generated multiple optical modulated signals have the same frequencies (center frequencies) as the frequencies of the optical carriers except for the predetermined optical carrier in the multiple optical carriers (i.e. the optical carriers participating in the modulation), respectively. The modulation process is the same as that described above, and thus is omitted here for simplicity.

In step S503, the multiple optical modulated signals and the predetermined optical carrier are synthesized into one optical signal which is subsequently transmitted to a receiving side via an optical fiber.

It may be seen that, in the signal transmitting method according to the embodiment of the invention, multiple optical carriers generated from the basic optical carrier are used to carry data signals, thus the transmission bandwidth of the transmitting device may be increased, and the performance of the optical communication system may be improved. Additionally, the predetermined optical carrier (e.g., the basic optical carrier) is not modulated, and is synthesized directly into the transmitted optical signal for use in subsequent reception process.

Figure 6:
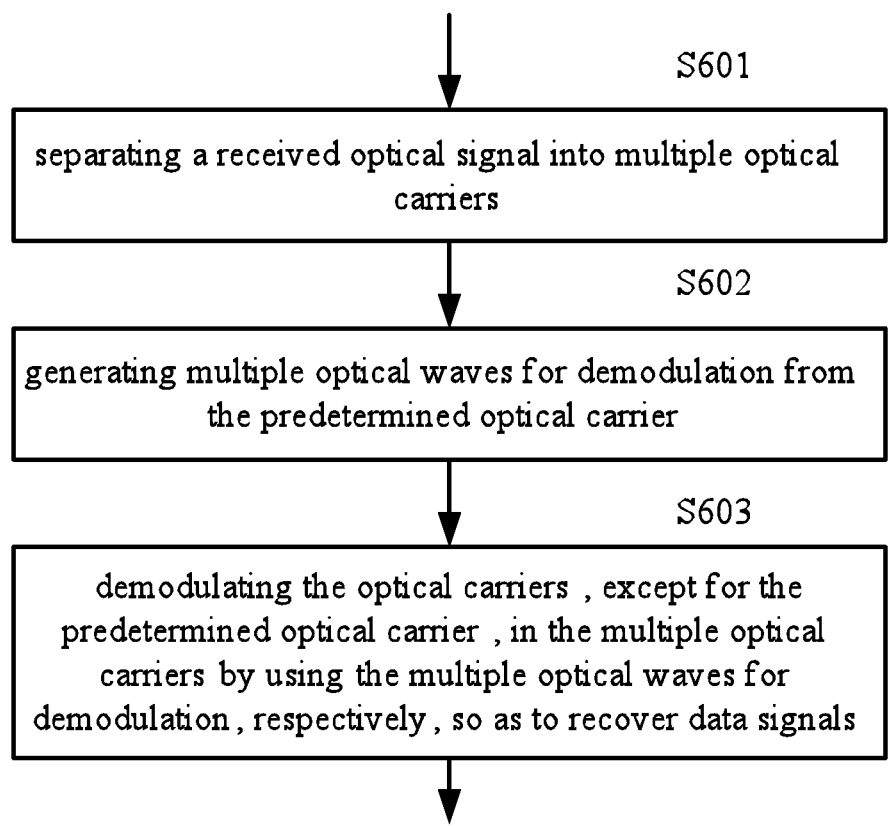
FIG. 6 is a flow chart showing a signal receiving method according to an embodiment of the invention.

The signal receiving method according to an embodiment of the invention is described below with reference to FIG. 6. As shown in FIG. 6, at the receiving side, the optical signal received from outside is separated into multiple optical carriers in step S601. The received optical signal may be a signal generated according to the method shown in FIG. 5. The multiple optical carriers have frequencies ($f_{2'}$, $f_{1'}$, $f_0$, $f_1$, $f_2$, ..., which are the same as those of the multiple optical carriers used in the transmitting side, respectively) different from each other, and include a predetermined optical carrier. The predetermined optical carrier here is the same as the predetermined optical carrier selected at the transmitting side, and it may be the basic optical carrier with a frequency of $f_0$, or an optical carrier different from the basic optical carrier.

As described above, it is possible to separate the predetermined optical carrier (e.g. the basic optical carrier ($f_0$)) from the optical signal, and then further separate the rest of the optical signal into multiple optical carriers (e.g. $f_{2'}$, $f_{1'}$, $f_1$, $f_2$, ...). Alternatively, all of the optical carriers ($f_{2'}$, $f_{1'}$, $f_0$, $f_1$, $f_2$, ...) may be generated from the optical signal at one time.

In step S602, multiple optical waves for demodulation are generated from the predetermined optical carrier. Frequencies of the multiple optical waves for demodulation are the same as the frequencies of the optical carriers, except for the predetermined optical carrier, in the multiple optical carriers. Subsequently, in the case where the generated multiple optical waves for demodulation are mixed together, the multiple optical waves for demodulation may be separated into optical waves dependent from each other by using a separator such as an optical filter. If optical waves which are separate from each other are generated from the predetermined optical carrier (e.g. the basic optical carrier), it is unnecessary to perform this separation operation. As described above, the multiple optical waves may be generated by shifting the predetermined optical carrier to multiple different frequency positions on the frequency axis, respectively, or may be generated in other manners commonly known in the art.

In step S603, the optical carriers ($f_k$), except for the predetermined optical carrier, in the multiple optical carriers are demodulated by using the multiple optical waves for demodulation ($f_k$), respectively, to thereby recover data signals. The demodulation operation may be performed by using the demodulation units described above with reference to FIG. 4, and the detailed description thereof is omitted here for simplicity.

As can be seen, in the signal receiving method according to an embodiment of the invention, instead of using conventional local oscillating optical sources to generate local oscillating lights, the optical waves for demodulation generated from the predetermined optical carrier separated from the received optical signal are used as the "local oscillating lights" to perform demodulation of the optical carriers. Thus, the local oscillating optical sources may be omitted, which reduces the cost of the system. Moreover, since it is possible to generate the optical waves for demodulation spanning a wide frequency band from the predetermined optical carrier (e.g. the basic optical carrier), a received optical signal on a wide frequency band may be received and demodulated, which improves the information transmission capability of the system.

Although the exemplary embodiments of the present invention have been shown and described, it is to be understood by those skilled in the art that various changes in form and details can be made to these exemplary embodiments without departing from the scope and spirit of the present invention as defined in the claims and equivalents thereof.

What is claimed is:

1. A signal receiving device, comprising: a separation unit for separating a received optical signal into multiple optical carriers, the multiple optical carriers having frequencies different from each other, and including a predetermined optical carrier,
   a multi-carrier generating unit for generating multiple optical waves for demodulation from the predetermined optical carrier, frequencies of the multiple optical waves for demodulation corresponding to frequencies of optical carriers, except for the predetermined optical carrier, in the multiple optical carriers, and
   a plurality of demodulation units for demodulating the optical carriers, except for the predetermined optical carrier, in the multiple optical carriers by using the multiple optical waves for demodulation, respectively, so as to recover data signals.

2. The device of claim 1, wherein the multi-carrier generating unit generates the multiple optical waves for demodulation by shifting the predetermined optical carrier to multiple different frequency positions on a frequency axis respectively.

3. The device of claim 1, further comprising another separation unit for separating the multiple optical waves for demodulation generated by the multi-carrier generating unit from each other.

4. A signal receiving method, comprising:
   separating a received optical signal into multiple optical carriers, the multiple optical carriers having frequencies different from each other, and including a predetermined optical carrier;
   generating multiple optical waves for demodulation from the predetermined optical carrier, frequencies of the multiple optical waves for demodulation corresponding to frequencies of optical carriers, except for the predetermined optical carrier, in the multiple optical carriers; and
   demodulating the optical carriers, except for the predetermined optical carrier, in the multiple optical carriers by using the multiple optical waves for demodulation, respectively, so as to recover data signals.

5. The method of claim 4, wherein the multiple optical waves for demodulation are generated by shifting the predetermined optical carrier to multiple different frequency positions on a frequency axis respectively.

6. The method of claim 4, further comprising separating the multiple optical waves for demodulation from each other.

* * * * *